L. A. WESTON.
APPARATUS FOR FORMING PIPE JOINTS.
APPLICATION FILED APR. 29, 1915.
1,174,209.
Patented Mar. 7, 1916.
3 SHEETS—SHEET 2.
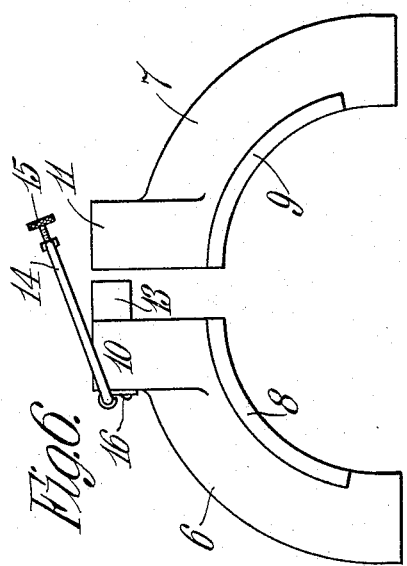
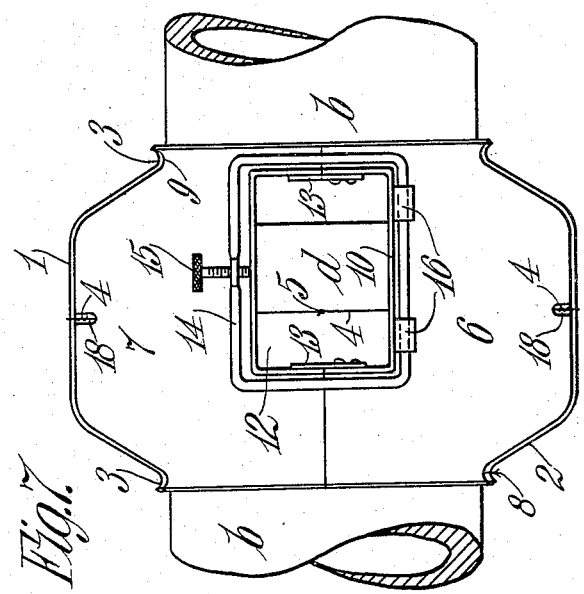
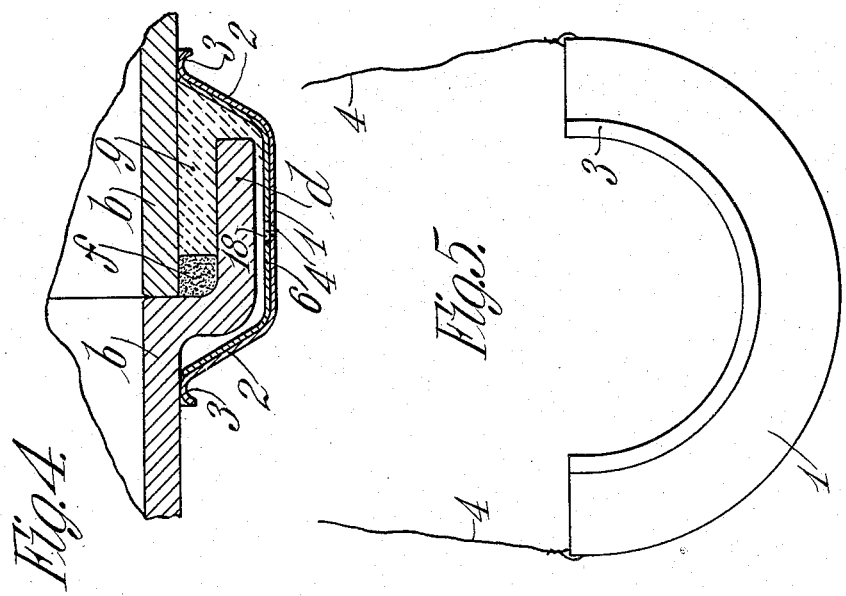
WITNESS
F. E. Hartwell.
INVENTOR.
Leroy A. Weston.
BY
Chapin + Co.
ATTORNEY.

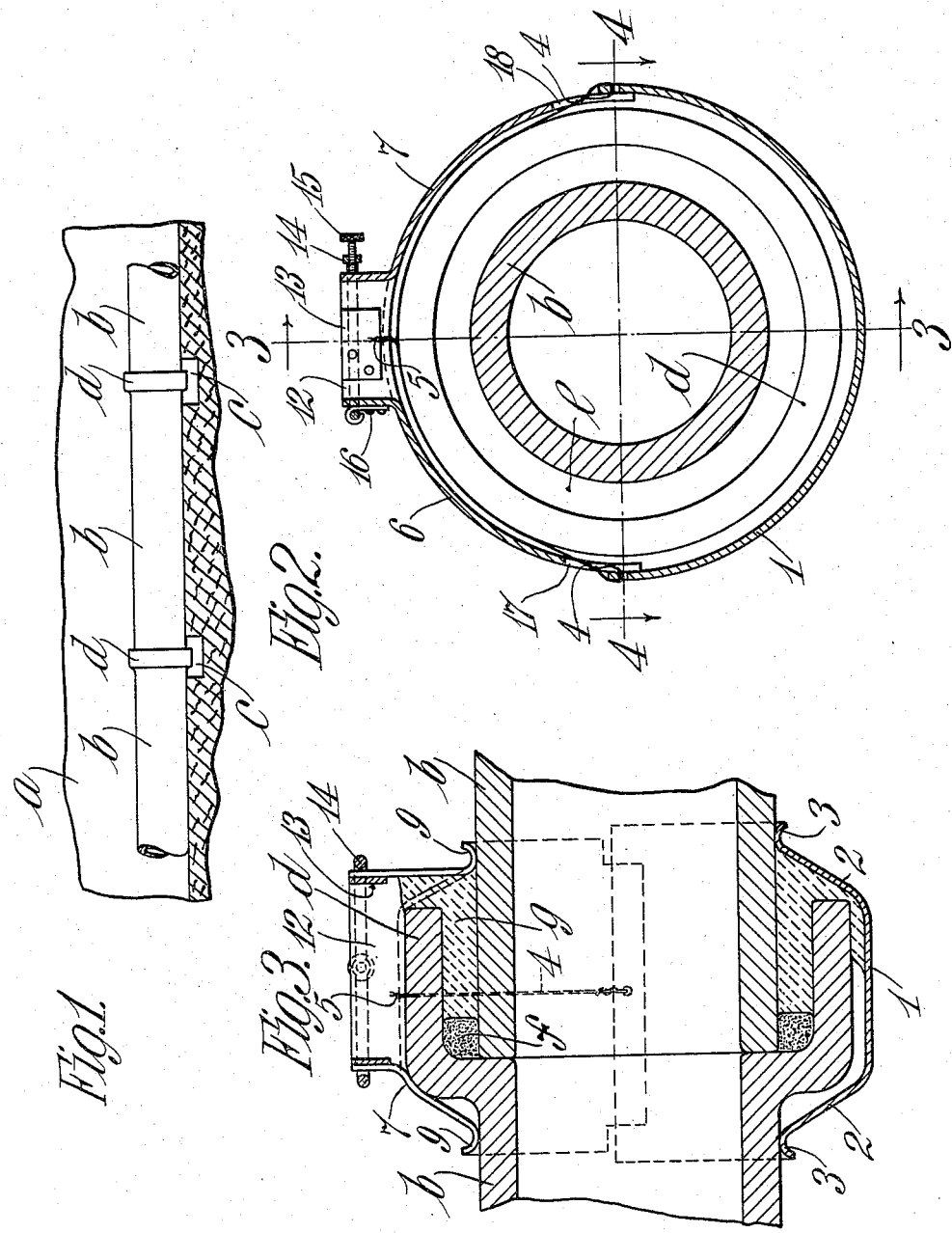

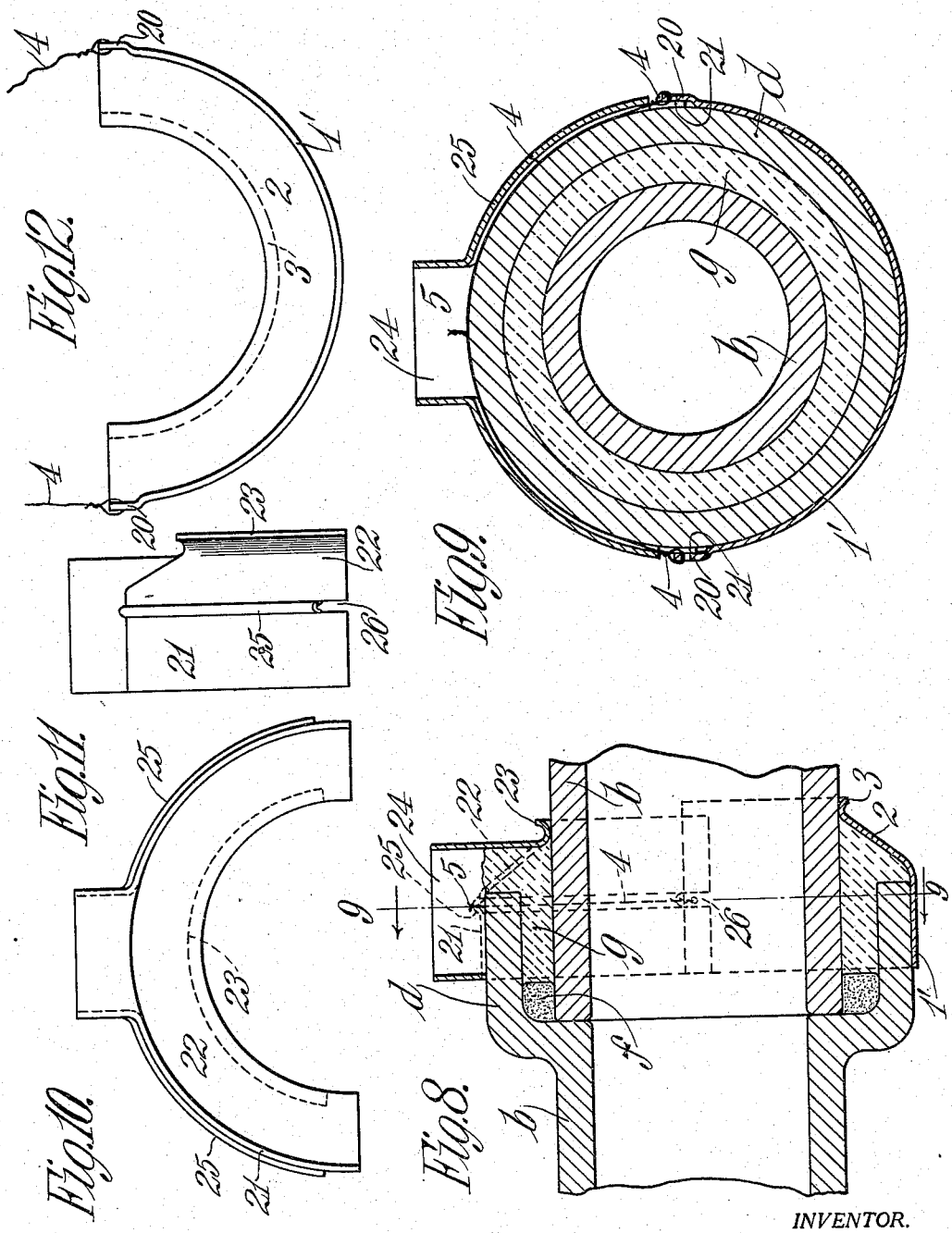

UNITED STATES PATENT OFFICE.

LEROY A. WESTON, OF ADAMS, MASSACHUSETTS.

APPARATUS FOR FORMING PIPE-JOINTS.

1,174,209.     Specification of Letters Patent.     Patented Mar. 7, 1916.

Application filed April 29, 1915. Serial No. 24,801.

*To all whom it may concern:*

Be it known that I, LEROY A. WESTON, a citizen of the United States of America, residing in Adams, county of Berkshire, and State of Massachusetts, have invented certain new and useful Improvements in Apparatus for Forming Pipe-Joints, of which the following is a specification.

This invention relates to apparatus for forming joints in sewer pipe.

It is particularly intended for use with the common "bell and spigot" form of tile pipe where, after a joint has been suitably calked, it is desired to fill the annular space between the spigot end of one pipe and the bell end of the mating pipe with cement or like material.

I am aware that many devices have, heretofore, been used for analogous purposes and that the use of mold forming members, adapted to be placed around the joined ends of pipes to facilitate the introduction of a cementing material, is not broadly new. However, the apparatus heretofore used for this purpose consists, so far as disclosed by the prior art, of elaborate, complicated structure, which is expensive to manufacture. Many of the devices formerly used are so complicated that their use in practice is prohibitively expensive. Others are so formed as to require specially formed pipe, which is impractical. Unless the apparatus is simple and of low cost, the time saved by the use of such apparatus is more than offset by the cost thereof. The desirable condition is to provide a simple device, which is inexpensive to manufacture and which may be quickly and readily applied to pipe.

An object of this invention is to provide a simple, inexpensive device which may be quickly applied to joined pipes to permit the introduction of cementing material to the joint between the pipes.

Another object is to provide apparatus of the class described, which may be applied to standard tile sewer pipe without necessitating modifications in the structure of the pipe.

A further object is to provide mold forming sections arranged to be placed around the meeting ends of pipes and to be removably secured thereto, said sections arranged for yieldable engagement with the peripheral portions of the pipe, whereby the molds are permitted to conform to the contour of the pipe.

In general, my apparatus comprises a lower mold section, preferably semi-circular in form, and one or more upper mold sections. The lower section is arranged to be slipped under the meeting ends of joined pipes and attached thereto, preferably by wires, and is intended to be left in place as a permanent part of the installation. The upper mold section or sections are adapted to be slipped over the pipe and removably held thereto by any suitable means. The one or more upper sections are suitably arranged to permit the introduction of cement to the annular space between the spigot end of one pipe and the bell of the other pipe. After the cement has hardened, said upper molds are removed and may be used over again.

One preferred embodiment of my invention is shown for the purposes of illustration in the accompanying drawings, in which:

Figure 1 is a sectional elevation of a sewer pipe installation in readiness to receive the mold sections; Fig. 2 is a cross-sectional view showing the mold sections applied to joined pipes; Fig. 3 is a sectional elevation taken on the line 3—3 of Fig. 2 and looking in the direction of the arrows; Fig. 4 is a plan section taken on the line 4—4 of Fig. 2 and looking in the direction of the arrows; Fig. 5 is an elevational view of the lower mold section; Fig. 6 is an elevational view of the upper mold sections; Fig. 7 is an exterior plan view of the apparatus applied to joined pipes. Fig. 8 is a sectional view similar to Fig. 3 showing a modified form of the apparatus; Fig. 9 is a cross sectional view taken on the line 9—9 of Fig. 8 and looking in the direction of the arrows; Fig. 10 is an elevational view of the upper mold section shown in Fig. 8; Fig. 11 is a side elevational view of Fig. 10; Fig. 12 is an elevational view of the lower mold section shown in Fig. 8.

Referring to the drawings in detail, *a* (see Fig. 1) represents a trench and *b* a number of tile pipes laid on and supported by the floor of the trench. Adjacent the meeting ends of the pipes *b*, pockets *c* are formed in the floor of trench *a* to receive the bell end *d* of the pipes *b*. These pockets *c* permit the lower mold sections to be slipped beneath and around the bells *d* in a manner to be described.

The lower mold section is clearly shown in Figs. 2, 3, and 5 and comprises a substantially semi-circular member 1, which has outwardly inclined side flanges 2. The inner ends of the latter are rounded as indicated at 3. Attached to each side of the member 1 near the upper end thereof is a wire 4, as shown in Fig. 5. The member 1 is arranged to be slipped beneath the bell d of the pipe b and is attached thereto, as clearly shown in Fig. 2 by twisting the wires 4 together. Thus, an annular chamber is formed around the lower half of the meeting pipes. It is to be noted that the portions 2 and 3 are yieldable and, as the wires 4 are tightened, the ends 3 are forced into all the irregular portions of the pipes and conform to the contour thereof. Thus, the member 1, when applied, forms an annular chamber around a portion of the pipes b which is effectually sealed by the spring action of the members 2 and 3.

The upper mold sections are best shown in Figs. 2, 6 and 7 and comprise two quadrant-shaped members 6 and 7, which are of the same cross-sectional shape as the lower mold section. The members 6 and 7 have rounded ends 8 and 9 on the inner edges of the flanges thereof which act in an analogous manner to the edges 3 of the member 1. The upper portions of the members 6 and 7 have vertically disposed channel shaped portions 10 and 11 which, when the two sections 6 and 7 are placed in abutting relation, as shown in Figs. 2 and 7, form a rectangular opening 12 to permit the entrance of cement. Secured to the section 6 are a pair of plates 13 which are arranged, as shown in Figs. 2 and 7, to overlap and engage the section 7.

14 represents a bail member, pivoted in brackets 16, which has a screw 15 mounted therein. The bail 14 is rectangular in form and is arranged, as shown in Fig. 7, to overlie the meeting channel portions 10 and 11. The latter may be effectually held together in abutting relation by tightening the screw 15. The lower ends of the sections 6 and 7 have the rounded portions 8 and 9 cut away to permit the lower edges to be slipped partially within the section 1, as shown in Figs. 2 and 3. The sections 6 and 7 are furthermore provided with slots 17 and 18 respectively to permit the sections 6 and 7 to be slipped into the section 1 without disturbing the wires 4.

In operation, the pipes b are laid, as shown in Fig. 1, with the spigot end of one pipe in the bell d of the adjacent pipe and the pockets c are dug out beneath the bells d as described. The annular space e (see Fig. 2) is then calked in the usual manner as indicated at f in Fig. 3 to prevent the subsequent entrance of cement into the interior of the pipes b. The lower mold section 1 is slipped beneath the bell d and secured thereto in the position shown in Fig. 2 by the wires 4. Thereafter the upper sections 6 and 7 are applied to the pipe with their lower edges fitting partially within the member 1, as shown in Fig. 2. The bail 14 is then brought over the channel shaped portion 11, and the screw 15 is tightened to hold the two sections 6 and 7 in abutting relation. Thus, a continuous annular chamber is formed around the joined portions of pipes b which is sealed as heretofore mentioned by the spring action of the side flanges of the mold sections. Cementing material is then introduced in to the opening 12 which fills the molds and the space e, as indicated at g in Figs. 3 and 4.

A modified and preferred form of the apparatus heretofore described is shown in Figs. 8 to 12 inclusive. As will be seen from these figures, this modified form of apparatus differs distinctively from the form already described in that a single upper mold section is used and that both upper and lower sections have a single side flange. Thus, with this form the molds only partially cover the bell portion of the pipe. The lower mold section is represented by the numeral 1' and has a single inclined side flange 2 with a rounded edge 3, being therefore of substantially L-shaped cross section. This member is substantially semi-circular in shape as shown in Fig. 12 and is adapted to be applied to the pipe and secured by wires 4 at 5, as already described. The member 1' has at its upper ends an outwardly offset portion 20 which is arranged to receive the lower ends of an upper mold section 21. The latter as clearly shown in Figs. 10 and 11 is substantially semi-circular in shape and has a single inclined side flange 22 with a rounded end 23 to engage the periphery of pipe b. Centrally formed in the upper portion of the mold 21 is a rectangular opening 24 whereby cementing material may be introduced to both mold sections as heretofore described. To permit the upper mold 21 to closely fit the bell portion d beaded portions 25 are provided which are arranged to overlie the wires 4 as clearly shown in Fig. 9. Slots 26 are provided near the lower ends of the section 21 to permit the latter to be slipped into the offset portions 20 without interfering with the wires 4. This modified form of apparatus is applied in a manner analogous to that already described. The lower section 1' is first slipped under the pipe and secured in the position shown in Fig. 8 by the wires 4. The upper member 21 is then placed over the upper portion of the pipe and the lower edges of the mold 21 are slipped into the offset portion 20. Cementing material may then be introduced into the opening 24 to fill the annular space e, as indicated at g in the manner already described. It will be seen that, since both upper and lower molds closely fit the bell $d$, a single flange 2 only is required. Thus, a more simple mold forming apparatus is provided which is considerably cheaper to manufacture than the form shown in Figs. 1 to 7.

Thus, I have provided a simple mold forming apparatus arranged for use in cementing the joints in sewer pipe. It is recognized that many changes and modifications may be made in the structure described without departing from the scope of my invention which is defined in the appended claims.

It is to be understood that the material composing the mold sections are made of thin flexible material, as thin galvanized wrought iron which will enable the sections to readily shape themselves to the external irregularities of the pipe sections. The beaded edges 3, 9, 23 and 25 do not prevent the mold-sections from readily bending or yielding when the tie-wires 4 are drawn around and over the pipe-section and secured together by reason of the thin material from which the sections are made. The mold sections are intended to be left permanently secured to the pipes.

What I claim is:

1. An apparatus for forming joints in sewer pipe, comprising, in combination, a lower one-piece mold section of thin flexible material arranged to be slipped around under and below the lower peripheral portions of the meeting ends of the pipes to be joined, means comprising tie wires attached to the ends of the mold section to secure said section to one of said pipes, an upper semi-circular shaped mold section arranged to fit around the remaining peripheral portions of said pipes and partially within the upper ends of said lower section, said upper section constructed and arranged to form an opening for the introduction of a cementing material to said mold sections and a communication with the lower mold section.

2. An apparatus for forming joints in sewer pipe, comprising, in combination, mold sections designed to fit around the external peripheral portions of two pipes to be joined, means formed in one of said sections to permit the introduction of a cementing material to said mold sections, and an outwardly inclined side flange on each of said sections constructed and arranged to engage the peripheral portions of one of said pipes with a yieldable spring action, whereby said sections may conform to the contour of said pipes and fit into any irregular portions therein.

3. An apparatus for forming joints in sewer pipes, comprising in combination, a substantially semi-circular one piece mold member of thin flexible material arranged to engage the lower peripheral portions of the two adjacent pipes to be joined, means comprising tie-wires to secure said member to one of said pipes, a yieldable side flange on said member adapted to bear with a spring action on one of said pipes, together with another mold member arranged to fit around the remaining peripheral portions of said pipes and partially within the first-named member, means formed in said last-named member to permit the introduction of a cementing material therein and into said first named member.

4. An apparatus for forming joints in sewer pipe, comprising, in combination, a semi-circular lower mold member, a yieldable inclined side flange thereon, said member arranged to fit around the lower peripheral portions of two pipes to be joined after the latter are in place, wires secured to said member arranged to be carried upwardly and over one of said pipes and thereafter twisted together whereby said member is held in position, together with an upper mold member arranged to fit around the remaining peripheral portions of said pipes and partially within said lower mold member, and means formed in said last-named member to permit a cementing material to be introduced into all of said molds.

5. A one-piece substantially semi-circular elastic member designed to engage and overlap the adjoining ends of two pipe sections for receiving joint forming material, said member being substantially L-shaped in cross-section and extending from the bell to the spigot portions of the pipe sections, and means to retain said member in place on the adjacent ends of the pipe, as described.

6. A one-piece substantially semi-circular elastic member designed to engage and overlap the adjoining ends of two pipe sections for receiving joint forming material, said member being substantially L-shaped in cross-section, means to retain said member in place on the adjacent ends of the pipe, and a section adapted for insertion within the upper ends of said member for introducing joint forming material into and around the meeting ends of the pipes.

7. An apparatus for forming joints in sewer pipe, comprising in combination, a one piece mold-member adapted to be inserted under and below the adjacent ends after the pipe sections are laid, means for retaining said member in position, and means of the same cross-sectional shape as the mold-member, adapted to be inserted between the upper ends of the said member and the adjacent ends of the pipe sections, said means having portions to form a channel or opening to serve for introducing the joint-forming material into the member for forming the joint, as described.

8. A one-piece substantially semi-circular elastic member designed to engage and overlap the adjoining ends of two pipe sections, said member having an outwardly turned or crimped edge for engaging the spigot end of a sewer pipe and its opposite edge being parallel with the axis of the pipe for engaging the outer surface of the bell-portion of a sewer pipe section, and a spanning or connecting inclined portion between the two edges, whereby the joint forming material is retained in place in the mouth of the bell, and a section adapted for insertion within the upper ends of the semi-circular section, as described, and means to secure the lower elastic member in place.

LEROY A. WESTON.

Copies of this patent may be obtained for five cents each, by addressing the "Commissioner of Patents, Washington, D. C."